A. B. EMERY.
SEPARATION OF ORES AND THE LIKE.
APPLICATION FILED MAR. 29, 1911.

1,272,642.

Patented July 16, 1918.
6 SHEETS—SHEET 1.

A. B. EMERY.
SEPARATION OF ORES AND THE LIKE.
APPLICATION FILED MAR. 29, 1911.

1,272,642.

Patented July 16, 1918.
6 SHEETS—SHEET 2.

WITNESSES:
Thos. J. Maguire
William H. Davis

INVENTOR:
Augustus B. Emery,
BY
Pennie & Goldsborough
ATTORNEYS

A. B. EMERY.
SEPARATION OF ORES AND THE LIKE.
APPLICATION FILED MAR. 29, 1911.

1,272,642.

Patented July 16, 1918
6 SHEETS—SHEET 4.

WITNESSES:
Thos. J. Maguire
William H. Davis

INVENTOR:
Augustus B. Emery,
BY
Kennie & Goldsborough,
ATTORNEYS

A. B. EMERY.
SEPARATION OF ORES AND THE LIKE.
APPLICATION FILED MAR. 29, 1911.

1,272,642.

Patented July 16, 1918.
6 SHEETS—SHEET 5.

UNITED STATES PATENT OFFICE.

AUGUSTUS B. EMERY, OF MESSINA, NORTH TRANSVAAL, SOUTH AFRICA.

SEPARATION OF ORES AND THE LIKE.

1,272,642.　　　　　　　　Specification of Letters Patent.　　Patented July 16, 1918.

Application filed March 29, 1911. Serial No. 617,623.

*To all whom it may concern:*

Be it known that I, AUGUSTUS B. EMERY, a citizen of the United States, residing at Messina, North Transvaal, South Africa, and whose post-office address is care of The Messina Development Company, Messina, North Transvaal, South Africa, have invented certain new and useful Improvements in the Separation of Ores and the like; and I do hereby declare the following to be a full, clear, and exact description of the invention, such as will enable others skilled in the art to which it appertains to make and use the same.

The object of this invention is to effect the separation of the various constituents of ore, that is to say, the mineral portion from the waste, (as, for instance, galena from quartz) without the preliminary close screen-sizing and without the preliminary classification of the particles which has heretofore been customary in the art. The invention is also applicable to the separation of the various constituents of other granular mixtures than ores, such, for instance, as slate from coal, etc.

Heretofore, in so far as I am aware, no successful machine has been devised to simultaneously classify and concentrate an unsized body of ore or the like upon a single deck or table. So also, in so far as I am aware, the separation of the various constituents of ore or the like has never before been proposed in an operation embodying the classification of the material by means of a rising current of air, and the concentration of the classified material either upon the same table or upon an auxiliary or supplemental table. My present invention supplies these deficiencies, and, in order to make more fully apparent its extent and scope, I will first briefly define the sense in which I employ herein the terms classification and concentration.

If an upward current of air or water is given sufficient velocity to hold suspended in it a particle of any material of light specific gravity having a certain diameter or size, a particle of heavier specific gravity which will be held suspended in the same air or water current must be of smaller diameter. If, therefore, a mixture of unsized particles is thus subjected to an upward current of air or water, the material will be stratified and divided into classified products. This separation of the unsized particles in accordance with their rate of settling in a rising body of fluid is known in the art as classification.

If any mixture of particles which has been properly classified is placed upon a deck or table surface to which a shaking, reciprocating, or oscillating motion is imparted, the fine particles of heavier specific gravity will settle through the coarser particles of lighter specific gravity and will thus come into direct contact with and cling to the surface. If, furthermore, such a surface is given a differential or bumping motion, and is inclined transversely to the direction of reciprocation, the finer material will be propelled in the direction of the bump, while the coarser material will roll down the incline of the surface. The ultimate effect is to separate the classified particles of like kind, and the operation is known in the art as concentration.

In the practice of my invention, I have devised a construction, whose characteristic mode of operation involves the conjoint or simultaneous use of the feature of classification and the feature of concentration upon a single deck or separating table, so that, as hereinbefore indicated, an unsized product, fed to the deck or table, may, in its treatment pass through the stages of classification and concentration simultaneously, in contradistinction to the complete separation of those operations, incident to the prior state of the art. In other words, by the employment of my invention, the two operations of classification and concentration are performed on the same deck or table, which both classifies or prepares the material for concentration and then concentrates it, so that no preliminary screen sizing (except between very wide limits) and no preliminary classification of the material is required. As will hereinafter more fully appear, the classification and concentration essential to the obtaining of the final products does not necessarily take place in separate periods, but may proceed simultaneously in a series of successive stages, in each of which classification and concentration is simultaneously taking place.

In the accompanying drawings, I have illustrated a concentrating table wherein air is employed as the classifying medium. In this pneumatic concentrating table are combined the two features above specified, whereby the table will both classify or prepare the material for concentration and then concentrate it. It will be understood, however, that the classifying fluid employed may be water or other liquid instead of air, in which event, the construction will be appropriately modified in certain of its details, without departing from the broad scope of the invention. Such modified construction is illustrated and described, for instance, in another application for Letters Patent of the United States, filed of even date herewith.

In the drawings,—

Similar letters of reference indicate similar parts throughout the several views.

Figures 1, 2, 3, 4:
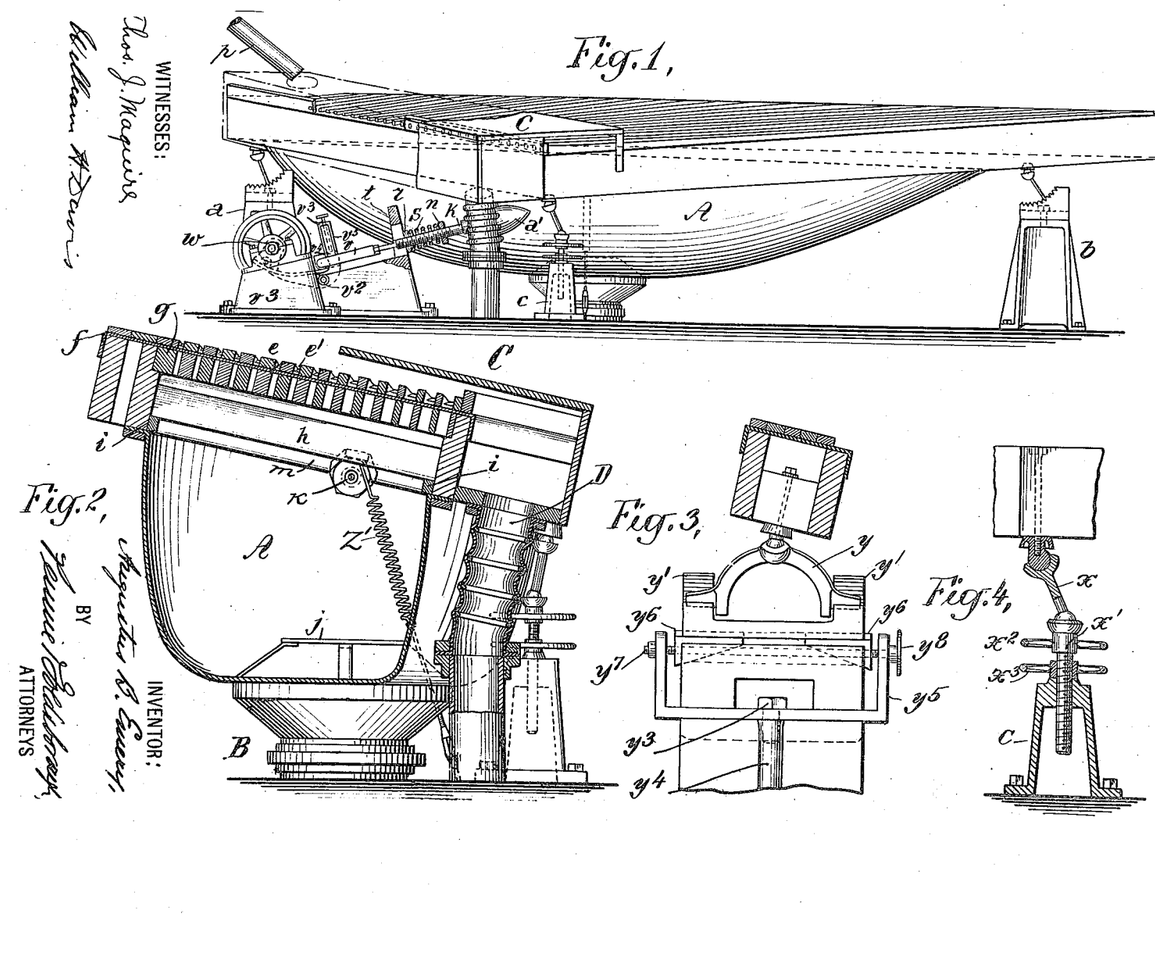
Figure 1 represents, partly in section, and with certain of the parts broken away, a side elevation of a pneumatic concentrator embodying my invention.
Fig. 2 represents a cross sectional view thereof, on the line 2—2 of Fig. 5.
Fig. 3 represents, on a somewhat larger scale, and partly in section, a detail view taken on the line 3—3 of Fig. 5, of one of the corner supports or rocker arms of the table deck.
Fig. 4 represents, partly in section and partly in elevation, the intermediate corner support thereof.

Referring to the drawings, it will be noted that the table, which is of general triangular shape, is supported at two of its three angles by means of rockers whose specific construction is illustrated more fully in Fig. 3. One of these rockers is mounted upon the pedestal $a$ at or near one end of the longest side of the table and the other is mounted upon a pedestal $b$ at the opposite end of the same side. The intermediate corner is supported by a universal joint mounted upon the pedestal $c$ and shown in detail more fully in Fig. 4. The particular construction of the rockers and of the universal joint will be hereinafter more fully set forth.

Figures 5, 6, 7:
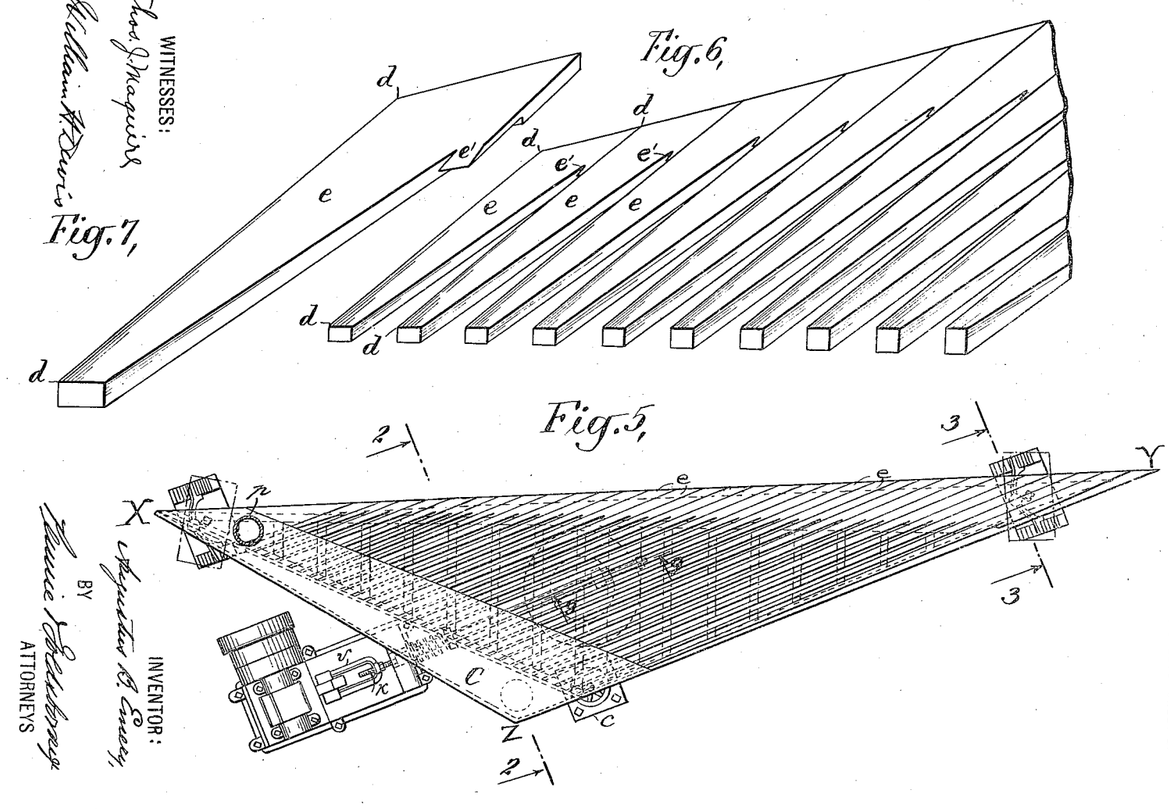
Fig. 5 represents a top plan view of the concentrator.
Fig. 6 represents, on a somewhat larger scale, a perspective view, showing the relative arrangement of a portion of the series of dead-space bars or partitions which separate the pockets of the table.
Fig. 7 represents a perspective view of one of these bars or partitions.
Figure 15:
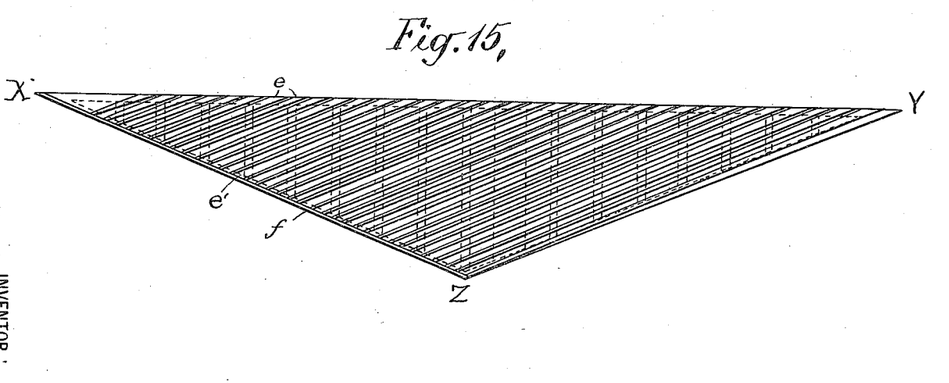
Fig. 15 represents a top plan view of a further modification of the table top or deck.
Figures 16, 17:
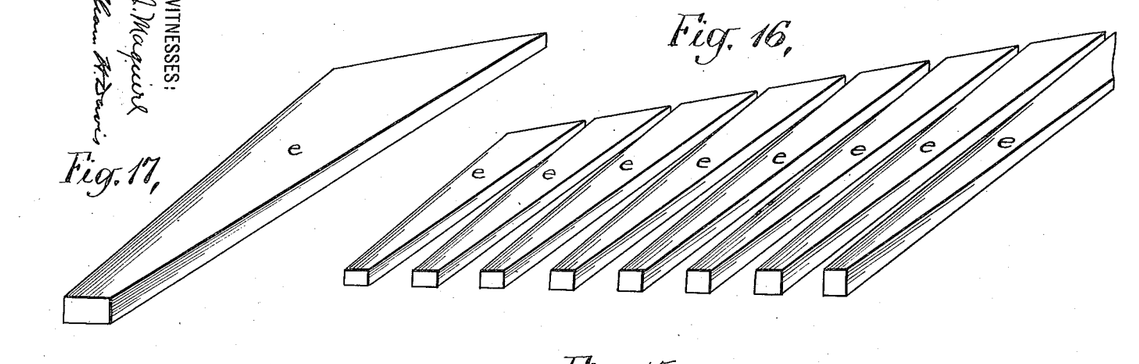
Fig. 16 represents, in perspective, a number of the pocket-forming bars or partitions thereof.
Fig. 17 represents, in perspective, one of these pocket-forming bars or partitions on a larger scale.
Figures 18, 19, 20, 21:
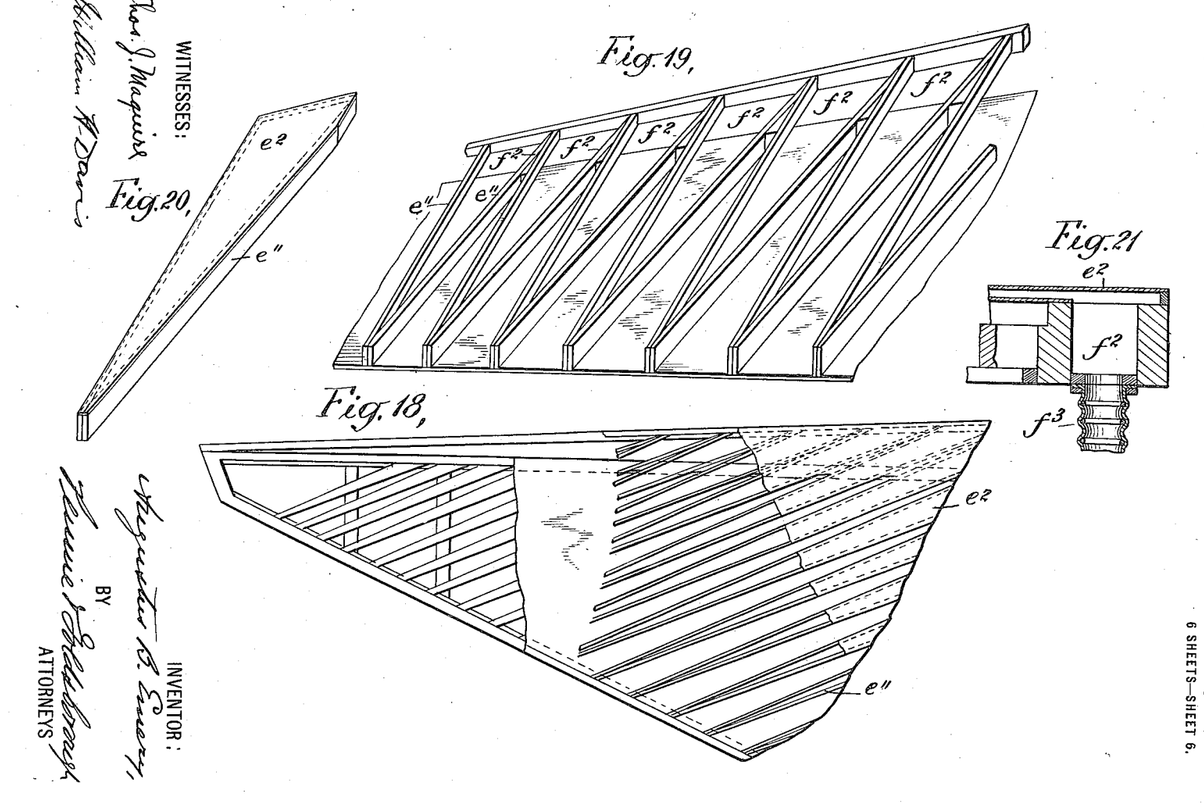
Fig. 18 represents a top plan view, with certain of the parts broken away, of a portion of a further modification of the table top or deck.
Fig. 19 represents, in perspective, a number of the pocket-forming partitions thereof.
Fig. 20 represents, in perspective, one of these pocket-forming partitions.
Fig. 21 represents, in section, the discharge end of one of the pockets of this last named modification.

The table proper or table deck is provided on its upper surface with a series of bars, one form of modification of which is shown, in detail, in Figs. 6 and 7. These bars, designated by the letters $e$, are of general wedge shape, in the sense that they increase in width from the feed side X Z of the table to the concentrates-discharge side X Y of the table. They are parallel to each other along the sides indicated by the letters $d\ d$ in Figs. 6 and 7 and, consequently, they form a series of wedge-shaped pockets which diminish correspondingly from the feed side to the concentrates-discharge side of the table. In the particular form shown in Figs. 6 and 7 (and also in Fig. 10) they are provided at a point intermediate of their main body portion and their outlying border with skimming inclines $e'$, extending respectively into the corresponding pockets for a limited distance from the extreme end thereof, and beneath this incline, the pockets communicate with a downtake $f$ (see Fig. 10). The skimming incline $e'$ has a specific function, which will be hereinafter set forth and may, in some instances, be omitted, as indicated in the construction shown in Figs. 12, 13 and 14, and also as shown in Figs. 15, 16 and 17, in which latter modification there is likewise omitted the outlying border beyond the main body portion of the pocket-forming bars.

Figures 8, 9, 10, 11:
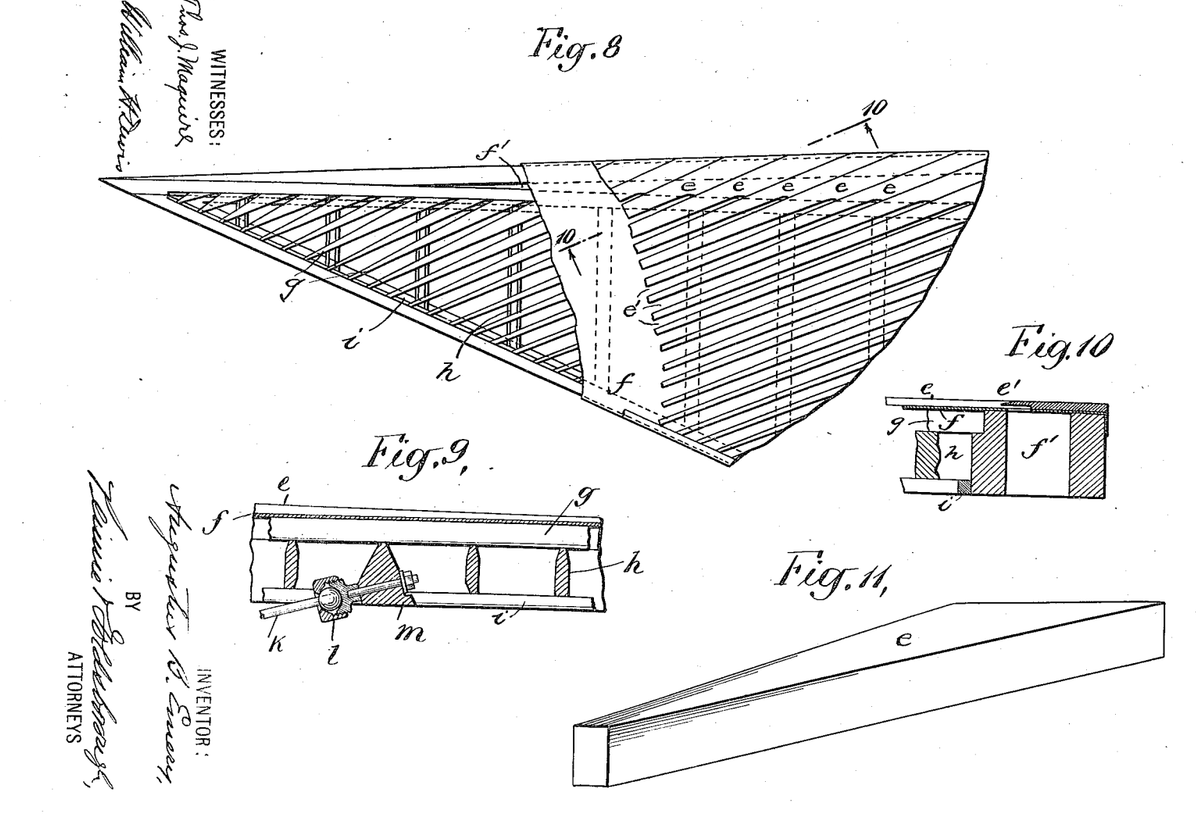
Fig. 8 represents a fragmentary view of a portion of the deck of the concentrator, and illustrates, in detail, the several principal elements thereof.
Fig. 9 represents a partial sectional view taken on the line 9—9 of Fig. 5.
Fig. 10 represents a partial sectional view taken on the line 10—10 of Fig. 8.
Fig. 11 represents, in perspective, one of the bars underlying the pocket bars or partitions shown.

Beneath the pocket bars $e$ and forming a pervious bottom for the pockets extends the pervious cloth $f$, which is suitably attached to the longitudinal members of the deck and which is likewise attached to the subjacent bars $g$, of a general shape and contour corresponding to that of the pocket bars *e*, as is indicated more fully in Figs. 2 and 8. The bars *g* are supported upon the cross ribs *h*, and these in turn rest upon cleats *i* secured to the longitudinal members of the table.

A bag A of cloth or like flexible material is secured to the underside of the table and is connected to an inlet conduit B supplying a current of air under pressure to the inside of the bag, whose sides are made impervious to the escape of the incoming air. The incoming air is directed against a plate *j* which serves to correspondingly distribute it and equalize its pressure in the bag. The arrangement is, therefore, such that a current of air under pressure is directed up through the pervious bottoms of the several pockets.

The several pocket-forming bars are all of the same height at their extreme ends along the side X Y of the table deck and increase in height uniformly toward the feed end of the table deck. This gradual increase in height is so chosen that the depth of the shortest and uppermost pocket of the series shall be say $\frac{9}{32}$ of an inch at the end proximate to the concentrates-discharge side X Y of the table and $\frac{5}{16}$ of an inch at the end proximate to the feed side X Z of the table; whereas the longest pocket (*i. e.*, the pocket proximate to the side Z Y) will have say a depth of $\frac{9}{32}$ of an inch at its concentrates-discharge end and a depth of $1\frac{1}{2}$ inches at its feed end. So also, the width of the several pockets will gradually increase, at the feed end thereof, from the top to the bottom of the series, the width at the feed end of the shortest pocket being say $\frac{1}{2}$ of an inch and of the longest pocket 2 inches. At the concentrates-discharge end of the several pockets they are preferably of about $\frac{1}{8}$ of an inch in width, so that the material will not jam therein.

As indicated fully in Figs. 1 and 2, the table is set at an incline. At its feed end it is provided with a cover C whose dotted outline is also shown in Fig. 1 and this cover extends along over the initial portion of the several pockets and is connected with an exhaust main D, through which is maintained a constant down-draft of air, so that any dust arising from the pockets will be drawn down into the main and to a suitable place of discharge, thereby saving annoyance to the operators from this source. The upper part of the exhaust main is made flexible, as indicated in the drawings, so as to permit it to accommodate itself to variations in the inclination of the table.

Motion is imparted to the table, in any suitable manner, as, for instance, by the head motion mechanism shown, which is of a type well known in the art and which is selected merely as illustrative of others which act upon the same principle of operation, *i. e.*, of imparting to the connecting rod a movement which, at the beginning of the forward stroke will be relatively slow and which will be rapidly accelerated at the termination of the forward stroke, likewise rapidly accelerated at the beginning of the return stroke and which will slow down at the termination of the return stroke. There are many of these so called head motion mechanisms familiar to the art, the particular one chosen for illustration being the well-known Deister head motion. Its main elements consist of a reciprocating rod *k* which, in this instance, is attached by a universal joint *l* at one end, to a cross piece *m* of the table deck. The rod *k* passes through the bag A, any substantial leakage from the bag being prevented by the auxiliary pocket *a'*, which is secured, at its mouth, about the rod. The rod *k* is screw-threaded, as shown in Fig. 1, and carries an adjustable nut *n*, between which nut and the free collar *r* reacts a spring *s*, thereby putting the rod under tension. The rod passes through a slotted abutment *t* and terminates in a yoke *v* which engages one arm $v^5$ of a rocking lever, pivoted at $v^2$, and whose other arm $v^3$ is rocked by a cam upon the motor shaft *w*. I have not considered it necessary to fully illustrate this well known Deister head motion mechanism, as its construction and its mode of operation are familiar to those versed in the art. The length of stroke of the mechanism may be varied by means of the adjusting screw $v^3$ engaging a nut on cross piece $v^4$ which spans the yoke *v* and which may, through the intermediacy of the screw be raised or lowered within the slotted arm $v^5$. The function of the head motion is to impart an abrupt forward jerk or bump and an equally abrupt return impulse to the table deck, so that the concentrates will be caused to move progressively toward the concentrates-discharge side of the table deck.

The ultimate motion imparted to the table, however, is likewise dependent upon the adjustment of the rocker arms upon the pedestals *a b* and the universal joint upon the pedestal *c*. The rocker arms *y* are connected to the table deck at their upper ends by ball and socket joints, as shown, and consist of forked or yoked supports having knife edges, which are adapted to engage with the notches in the arc-shaped support *y'*, so that they may be set at various angles to the perpendicular, and independently of each other. They are also capable of axial adjustment to any desired angle through the instrumentality of the screw bolt $y^3$ which engages the screw socket $y^4$, so that, by loosening the screw bolt, the yoke $y^5$ may be rotated and thereafter fixed in the desired adjustment by again tightening up the bolt $y^3$. So also, the arc-shaped supports *y'* of the rocker arms may be adjusted vertically (raised or lowered) by means of the wedges $y^6$ which engage grooves in the upper and lower surface of the said supports and which are mounted upon a right and left hand screw thread of a rod $y^7$ having an operating hand wheel $y^8$. By rotating the hand wheel in one direction, the wedges $y^6$ will be caused to approach each other, thereby raising the arc-shaped supports $y'$ and consequently raising the corresponding corner of the table, and, by rotating the hand wheel $y^8$ in the opposite direction the wedges $y^6$ will be caused to recede from each other and will lower the arc-shaped supports $y'$ and the corresponding corner of the table correspondingly.

In like manner, the intermediate corner of the table above the pedestal $c$ may be raised or lowered by means of the screw $x'$ engaging the screw-threaded aperture in the pedestal $c$ and adapted to be turned by the hand wheel $x^2$ and to be set in the position chosen, by means of a lock nut operated by the hand wheel $x^3$. The link $x$ is provided at both its upper and lower ends with a ball and socket joint so as to give absolute freedom of motion at the corresponding corner, as determined by the relative position of adjustment of the rocker arms on the pedestals $a$ $b$. It will, of course, be evident that by rotating axially, from a position of parallelism to each other, to one of non-parallelism, as indicated, for instance, by dotted lines in Fig. 5, the table deck can be given a double motion, in the sense that the different corners of the table move in such case in different directions, and this adjustment can be made with great delicacy so as to adapt the relative motions accurately to the treatment of particular ore mixtures.

A tension spring $Z'$ is attached at one end of the cross-piece $m$ of the table deck, and at the other end to the floor upon which the table rests. The object of the spring is to hold the table firmly down upon its supports and it is provided, as shown, with a turn-buckle to adjust its tension.

The mode of operation of the table is as follows:

The material to be concentrated is fed from a suitable supply pipe $p$ or the like to the feed corner X of the table, and falls on the pervious surface of the table immediately in front of the first pocket. The action of the air issuing through the pervious cloth provisionally classifies the material, and the differential reciprocating motion of the table tends to move the material across the surface toward the concentrates-discharge side X Y thereof, this effect being due to the abrupt forward bump or jerk and the abrupt rearward bump or jerk inherent in the operation of the head movement. The continuation of the feed results in the gradual filling of the wedge-shaped pockets from one to another in series. The upwardly blowing air current blows out the finest stuff from the mass and this finest stuff either passes down the table or is drawn into the dust suction main D. The next lighter material rises to the surface of the mass and works over the edge of the first pocket into the next pocket. The remaining material is driven along the pocket until the decreasing area of the cross section of the pocket forces all but the heaviest of the classified material out over the top of the pocket at the extreme end thereof.

Figures 12, 13, 14:
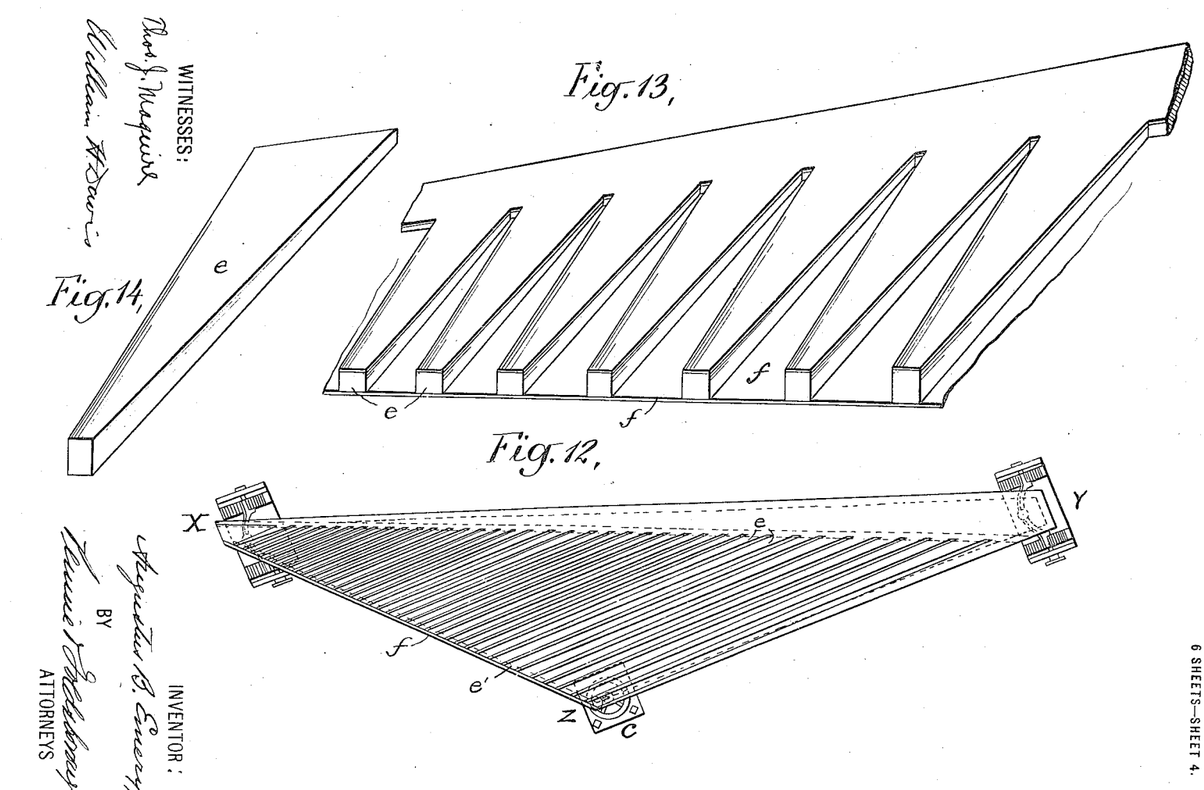
Fig. 12 represents a top plan view of a slightly modified form of table top or deck.
Fig. 13 represents a perspective view of a portion of the upper surface of said top or deck.
Fig. 14 represents, in perspective, one of the pocket-forming bars or partitions thereof.

The material which is forced out of the pocket, passes on to the plain surface of the table where there are no rising air currents; that is, it passes on to the top surface of the bars $e$, which are preferably covered with rubber or some similar substance, as shown, for instance, in Fig. 13, for the purpose of causing the fine particles to stick or adhere more closely thereto. Upon this surface the fine material settles down through the coarse and clings to the rubber covering.

Instead of providing the bars or partitions which separate the pockets from each other with rubber or the like for increasing the surface friction, I may, in some instances, cover the partitions with pervious cloth, as illustrated, for instance, in the modification shown in Figs. 18 to 21 inclusive. In such instance, the partitions will conveniently consist of transverse pieces $e''$ covered by the pervious cloth $e^2$. There will, therefore, be formed, within each of the wedge-shaped partitions, a hollow interior space covered by the pervious cloth $e^2$ and these interior spaces will communicate at their outer or wider ends with a space $f^2$, which is put in communication, by means of a suitable flexible trunk $f^3$, with an air exhaust fan or the like, for the purpose of establishing such a down current of air through the material resting upon the pervious cloth surface $e^2$, as will give the desired surface adhesion appropriate to the particular kind or character of the material undergoing separation. It will be understood that the purpose of thus causing a downward air current through the pervious cloth $e^2$ is to increase the tendency of the finer and heavier particles to settle down upon the cloth and to cling to the top surface of the partitions, thereby correspondingly insuring the efficiency of the concentrating action.

The differential reciprocating motion of the table drives the fine material along in the direction of the concentrates-discharge side X Y, while the coarser material, owing to the slope given to the table, tends to work down across the plain surfaces of the bars $e$ lying between the pockets until it reaches the next pocket of the series. The final result is that the fine portion of the material is driven over the plain surface of the table until it is finally discharged along the edge X Y, while the coarse portion travels across the table and is discharged along the edge Z Y or tailings discharge edge.

To make still more clear the mode of operation, we will assume that the material fed to the table deck contains a large piece of galena, a small piece of galena, a large piece of quartz and a small piece of quartz. When these pieces reach the first pocket, the large piece of galena at once sinks to the bottom of the pocket and remains there until it is finally discharged at the concentrates-discharge end of the pocket. The small piece of galena and the large piece of quartz, in accordance with the principles of classification, remain side by side above the large piece of galena. Above these two will come the small piece of quartz. As this material advances in the pocket toward the concentrates-discharge end thereof, some of it will be forced out of the pocket owing to the constantly diminishing space. The first to go over the edge will be the small piece of quartz, which will travel along the plain surface of the next lower bar, but as the plain surface, at the beginning of the pockets is narrow, the small piece of quartz will soon fall into the next pocket. Farther along the pocket, near the concentrates-discharge side X Y, the small piece of galena and the large piece of quartz will together be crowded out of the pocket, but the small piece of galena will advance along the plain surface, in the direction of the head motion, while the large piece of quartz will roll down the table deck in the direction of its inclination, until it reaches the next succeeding pocket. In this manner, all of the galena, both coarse and fine particles, is finally brought together and discharged from the concentrates-discharge side X Y of the table, and all the waste of quartz is brought together and discharged along the lower side of Z Y of the table. It will be noted that the plain or dead-surface of the table upon which the material is separated after it has been classified in the pockets, constantly increases in aggregate are from the feed side to the discharge side of the table deck, until finally it reaches a clear dead-space beyond the points of the pockets. On this smooth surface, the final separation is completed.

It will be apparent that the motion of the table at the various parts thereof will, as has hereinbefore been indicated, be affected according to the angle at which the rocker arms supporting the corners X and Y are set with relation to the horizontal, this adjustment giving an upward and forward motion and a return backward and downward motion, the word "forward" being used in the sense of direction toward the corner Y. This motion tends to lift the material and move it over the surface of the table at a greater speed than it would have if the rocker arms were perpendicular.

The various motions which the table can have in a horizontal plane, in addition to those due to the head motion, are as follows:

If the rockers at the corners X and Y are set parallel to each other and at right angles to the direction of the reciprocating rod $k$, the motion of the table will be in line with the reciprocating motion of the rod. If, now, the rocker arm at either one of the corners X or Y (say, for example, Y) is twisted about its center and placed horizontally at a slight angle to the axis of the rocker arm at X, the two corners X and Y of the table will have different motions horizontally. The motion at each corner will be at right angles to the axis of the rocker arm, but they will make a slight angle with each other. The effect of this difference in horizontal motion of the table top is to carry the ore or material on the top in one direction at corner X and in a slightly different direction at corner Y. By suitable adjustment, it is therefore possible to change the line of discharge of the concentrates along the edge of the table, so as to discharge the concentrates either farther up or farther down the edge X Y of the table, as may be most suitable to the material being treated. The ball and socket support at the corner Z permits this corner to take on any motion necessary to allow the table top to follow the rockers X and Z.

It will be seen therefore, that the table is capable of the following adjustments which affect its motion:

1. The length of stroke of the head motion can be increased or diminished.
2. The angle which each rocker arm makes to the perpendicular can be changed so as to give the table either a reciprocating motion in a horizontal plane or an upward and forward and backward and downward motion, that is to say, motion in the arc of a vertical circle. These motions may be given to the table as a whole, or the two ends $x$ and $y$ may have different motions, one, say in a horizontal plane, and the other in a plane inclined to the horizontal according to the angle at which the respective rockers are set with relation to the horizontal.
3. The pedestal or base upon which the rocker arms work can be revolved in a horizontal plane so as to change the direction of the motion which the table top has at either one or both of the corners X or Y, the result being to give the table top a series of different horizontal motions at various portions of its surface, or a horizontal motion not parallel to the longitudinal direction of the pockets.
4. In addition to these adjustments, the three supports of the table can be adjusted in height, independently of each other.

The special concentrates-discharge for the pockets, which is shown in Fig. 10 of the drawings, is for the purpose of discharging the coarse concentrates as fast as accumulated, rather than compelling them to travel the full length of the table along the points of the pockets before being discharged.

The method of accomplishing this is to employ the horizontal wedge, or skimming projection $e'$ near the end of the pocket, so arranged that it will slice horizontally the traveling body of ore. The bottom portion of the mass, which consists of clean concentrates, is discharged underneath the wedge into the special discharge space $f$ provided in the table frame. Part of the mass which consists of some concentrates and other material, is, by the action of the wedge $e'$, thrown beyond the pocket and upon the surface of the table and falls into the next pocket for retreatment. In practice, only a sufficient number of these discharges would be used to draw clean concentrates from the table, the balance of the openings being plugged.

What I claim is:

1. The method of separating ores which consists in classifying a mass composed of particles having a substantial variance in size, into strata according to the size and specific weight, and coincidently concentrating the classified material to collect concentrates from a plurality of strata and to discharge gangue.

2. The method of separating ores which consists in classifying a mass composed of particles having a substantial variance in size into strata according to the size and specific weight by subjecting it to the lifting action of a rising body of air, and coincidently concentrating the classified material to collect concentrates from a plurality of strata and to discharge gangue.

3. The method of separating ores which consists in classifying a mass composed of particles having a substantial variance in size into strata according to the size and specific weight by subjecting it to the lifting action of a rising body of air, and coincidently concentrating the classified material by subjecting it to a jerking motion upon a fractional surface to collect concentrates from a plurality of strata and to discharge gangue.

4. The process of separating ores which consists in classifying a mass composed of particles having a substantial variance in size into strata according to the size and specific weight, with strata containing particles of both concentrates and gangue, and coincidently concentrating each stratum to collect concentrates from a plurality of strata and to discharge gangue.

5. The process of separating ores consisting in classifying a mass containing particles having a substantial variance in size into strata according to the size and specific weight, coincidently separately concentrating each stratum to separately collect concentrates from a plurality of strata and to discharge gangue.

6. The process of separating ores consisting in classifying a mass containing particles having a substantial variance in size into strata according to the size and specific weight, coincidently separately concentrating each stratum to separately collect concentrates from a plurality of strata and to discharge gangue and discharging the concentrates at different points according to the size of the particles.

7. In apparatus for separating ores and the like the combination of means for classifying a mass composed of particles having a substantial variance in size into strata according to the size and specific weight of the particles, means for coincidently concentrating the classified material, and means for separately collecting the concentrates and gangue.

8. In apparatus for separating ores and the like the combination of means for classifying a mass composed of particles having a substantial variance in size into strata according to the size and specific weight of the particles, means for coincidently separately concentrating each stratum, and means for separately collecting the concentrates and gangue.

9. An apparatus for separating ores and the like comprising a table provided throughout a portion of its surface with means for classifying a mass composed of particles having a substantial variance in size into strata according to the size and specific weight of the particles, said table having other portions arranged to separately receive from the classifying portions different strata of the classified material and to concentrate such strata separately, and means for effecting the discharge of said concentrates at different points according to their size.

10. In apparatus for separating ores and the like, a table for receiving a mass composed of particles having a substantial variance in size, means for forcing a rising body of air through the mass, thereby classifying the material in strata according to the size and specific weight of the particles, frictional surfaces on said table arranged to receive as separate portions the different strata of the classified material, and means for vibrating the table to effect the concentration of the material on the frictional surfaces.

11. In apparatus for separating ores and the like a table for receiving a mass to be separated composed of particles having a substantial variance in size, said table having pockets, means for forcing a rising body of air through the material in the pockets thereby classifying the material in the strata according to the size and specific weight of the particles, frictional surfaces adjacent the pockets arranged to receive the different strata of material in the pockets at different points on the surfaces, and means for vibrating the table to concentrate the material on the frictional surfaces.

12. Apparatus for separating ores and the like, comprising means for subjecting the material to the lifting and classifying action of a rising body of air, means for subjecting the classified material simultaneously to the action of gravity and to a jerking motion upon a frictional surface, for the concentration thereof, and means for causing a down-draft through said frictional surface; substantially as described.

13. A separator for ores and like material, consisting of a deck, having classifying pockets, and having concentrating surfaces beyond said pockets, skimmers at the ends of the pockets to assist in feeding the upper layers of the classified material to the said concentrating surfaces, discharge chutes for the lower layer of the classified material, means for subjecting the material in the pockets to the lifting and classifying action of a rising body of fluid and means for imparting to the deck a motion tending to cause the particles to travel across the rising body of fluid; substantially as described.

14. A separator for ores and like material, consisting of a deck, having classifying pockets decreasing in width from their feed ends to their discharge ends, and having concentrating surfaces, means for subjecting the material in the pockets to the lifting and classifying action of a rising body of fluid and means for imparting to the deck a motion tending to cause the particles to travel across the rising body of fluid; substantially as described.

15. A separator for ores and like material, consisting of a deck, having classifying pockets decreasing in width from their feed ends to their discharge ends and having intermediate concentrating surfaces increasing in width from their feed end to their discharge end, means for subjecting the material in the pockets to the lifting and classifying action of a rising body of fluid and means for imparting to the deck a motion tending to cause the particles to travel across the rising body of fluid; substantially as described.

16. A separator for ores and like material, consisting of a deck, having classifying pockets, and having intermediate concentrating surfaces, the classifying pockets increasing in length in the series, means for subjecting the material in the pockets to the lifting and classifying action of a rising body of fluid and means for imparting to the deck a motion tending to cause the particles to travel across the rising body of fluid; substantially as described.

17. A separator for ores and like material, comprising a deck, provided with rocking supports for the deck arranged in triangular relation to each other, two of said supports consisting of arms adjustably mounted upon knife edges in notched base-blocks, and the intermediate support consisting of an arm connected to its base and to the deck by universal joints; substantially as described.

18. A separator for ores and like material, consisting of a deck or table, and a rocking support therefor, comprising a base having notches distributed along the upper face of the base, a rocker with knife edges to engage within the notches, and a ball and socket joint connecting the deck or table with the rocker, the base being axially mounted and adjustable around the axis; substantially as described.

19. A separator for ores and like material, consisting of a deck or table, and a rocking support therefor, comprising a base having notches distributed along the upper face of the base, a rocker with knife edges to engage within the notches, and means for adjusting the height of the base; substantially as described.

20. A separator for ores and like material, consisting of a deck or table, and a rocking support therefor, comprising a base having notches distributed along the upper face of the base and engaged by the rocking support, and means for adjusting the height of the base, the base being axially mounted and adjustable around the axis; substantially as described.

21. A separator for ore and like material, consisting of a deck or table having a bottom pervious to air but impervious throughout to the material to be treated, means for passing a rising body of air through a portion of said bottom and means for causing a downflow of air through another portion of said bottom; substantially as described.

22. A separator for ore and like material, consisting of a deck or table having a bottom pervious to air but impervious throughout to the material to be treated, means for passing a rising body of air through a portion of said bottom and means for causing a suction of air through another portion of said bottom; substantially as described.

23. A separator for ores and like material, consisting of a deck or table having a pervious bottom, means for passing a rising current of air through portions of said pervious bottom and means for causing a downflow of air through intermediate portions of said bottom; substantially as described.

24. A separator for ores and the like, having an inclined deck provided with a series of pockets having pervious bottoms and having intervening concentrating spaces between the pockets, means for producing an upward flow of air through the pervious bottoms, and means for imparting a reciprocating motion to the deck; substantially as described.

25. A separator for ores and the like, having an inclined deck provided with a series of pockets having pervious bottoms and having intervening concentrating spaces between the pockets, the width of the individual pockets diminishing from the feed side to the concentrates-discharge side of the table, means for producing an upward flow of air through the pervious bottoms, and means for imparting a reciprocating motion to the deck; substantially as described.

26. A separator for ores and the like, having an inclined deck provided with a series of pockets having pervious bottoms and having intervening concentrating spaces between the pockets, the width of the individual pockets diminishing and the width of the intervening individual concentrating spaces increasing from the feed side to the concentrates - discharge side of the table, means for producing an upward flow of air through the pervious bottoms, and means for imparting a reciprocating motion to the deck; substantially as described.

27. A separator for ores and the like, having an inclined deck provided with a series of pockets having pervious bottoms and having intervening concentrating spaces between the pockets, successive pockets increasing in length toward the tailings-discharge side of the table and increasing in width along the feed side of the table, means for producing an upward flow of air through the pervious bottoms, and means for imparting a reciprocating motion to the deck; substantially as described.

28. A separator for ores and the like, having an inclined deck provided with a series of pockets having pervious bottoms and having intervening concentrating spaces between the pockets, successive pockets increasing in length toward the tailings-discharge side of the table and increasing in width along the feed side of the table and increasing in height along the feed side of the table, means for producing an upward flow of air through the pervious bottoms, and means for imparting a reciprocating motion to the deck; substantially as described.

29. A separator for ores and the like, provided with an inclined deck having a series of air pockets, alternating with a series of concentrating spaces, said concentrating spaces having plane surfaces designed to receive the discharge from the pockets, means for producing an upward flow of air through the air pockets, and means for imparting a reciprocating motion to the deck; substantially as described.

30. A separator for ores and the like, provided with an inclined deck having a series of air pockets, alternating with a series of concentrating spaces designed to receive the discharge from the pockets, means for producing an upward flow of air through the air pockets, and a downward flow of air through the concentrating spaces, and means for imparting a reciprocating motion to the deck; substantially as described.

31. A separator for ores and the like, provided with an inclined triangular deck having a series of longitudinally-narrowing air pockets, means for producing an upward flow of air through the pockets, and means for imparting a reciprocating motion to the deck in a direction generally parallel to the longitudinal axis of the pockets, the smaller ends of the several pockets being arranged to terminate beyond those of the pockets preceding them in the series; substantially as described.

32. A separator for ores and the like, provided with an inclined deck having a series of longitudinally - narrowing air pockets, means for producing an upward flow of air through the pockets, and means for imparting a reciprocating motion to the deck in a direction generally parallel to the longitudinal axis of the pockets, the smaller ends of the several pockets being arranged to terminate beyond those preceding them in the series, said deck being provided with concentrating spaces between the pockets and being provided with a further concentrating space lying beyond the extreme ends of the pockets; substantially as described.

In testimony whereof I affix my signature, in presence of two witnesses.

AUGUSTUS B. EMERY.

Witnesses:
 JOHN C. PENNIE,
 WILLIAM H. DAVIS.

CERTIFICATE OF CORRECTION.

Patent No. 1,272,642.  Granted July 16, 1918, to

AUGUSTUS B. EMERY.

It is hereby certified that error appears in the printed specification of the above numbered patent requiring correction as follows: Page 6, line 54, claim 3, for the word "fractional" read "frictional"; and that the said Letters Patent should be read with this correction therein that the same may conform to the record of the case in the Patent Office.

Signed and sealed this 24th day of June, A. D. 1930.

(Seal)

M. J. Moore,
Acting Commissioner of Patents.